United States Patent [19]

Kemshall

[11] Patent Number: 5,520,258
[45] Date of Patent: May 28, 1996

[54] PIVOTAL CONTROL PANEL FOR ELECTRIC FORKLIFT TRUCKS

[75] Inventor: Paul A. Kemshall, Basingstoke, England

[73] Assignee: Crown Equipment Corporation, Inc., New Bremen, Ohio

[21] Appl. No.: 216,137

[22] Filed: Mar. 22, 1994

[30] Foreign Application Priority Data

Mar. 22, 1993 [GB] United Kingdom ............... 9305871

[51] Int. Cl.⁶ ....................................................... B60S 5/06
[52] U.S. Cl. ..................... 180/68.5; 180/286; 180/315; 180/326
[58] Field of Search ................... 180/68.5, 65.8, 180/315, 326, 329, 334, 286, 289; 296/70, 72, 73, 37.15; 74/473 P

[56] References Cited

U.S. PATENT DOCUMENTS

| | | | |
|---|---|---|---|
| 1,299,979 | 4/1919 | Malburg | 180/286 |
| 2,605,008 | 7/1952 | Schroeder | 180/68.5 |
| 2,609,268 | 9/1952 | Nye | 180/68.5 |
| 2,876,857 | 3/1959 | Beyerstedt | 180/68.5 |
| 3,610,359 | 10/1971 | Becker | 180/68.5 |
| 3,829,121 | 8/1974 | Ahrendt | 180/68.5 |
| 4,238,008 | 12/1980 | Higgins et al. | 180/328 |
| 4,311,205 | 1/1982 | Goodacre et al. | 180/68.5 |
| 4,312,418 | 1/1982 | Rittman | 180/68.5 |
| 4,411,582 | 10/1983 | Nakada | 414/636 |
| 4,943,756 | 7/1990 | Conley, III et al. | 318/671 |
| 5,014,811 | 5/1991 | Valencic et al. | 180/286 |

FOREIGN PATENT DOCUMENTS

| | | | |
|---|---|---|---|
| 0498611 | 8/1992 | European Pat. Off. . | |
| 2046676 | 11/1980 | United Kingdom | 180/68.5 |

*Primary Examiner*—Anne Marie Boehler
*Attorney, Agent, or Firm*—Thompson Hine & Flory

[57] ABSTRACT

A forklift truck, in particular an electric reach truck, having an operator's compartment with a battery compartment located to the side of the operator. An operator's console is pivotally mounted above the battery compartment so as to be movable into a position where access to the battery can be obtained for servicing or exchange of the battery.

12 Claims, 3 Drawing Sheets

PIVOTAL CONTROL PANEL FOR ELECTRIC FORKLIFT TRUCKS

BACKGROUND OF THE INVENTION

The present invention relates to battery powered forklift trucks, and in particular, to an electric reach truck having a pivotal control panel.

Forklift trucks are typically diesel powered or battery powered. The present invention relates to battery powered trucks and addresses the technical problem of improving the access to the battery in such a forklift truck. The invention is particularly relevant to reach trucks which are typically used within warehouses and in other confined spaces and are required to be compact in design. However, the invention may also be applied to other types of forklift trucks.

The battery used to power an electric reach truck is a large and heavy lead acid battery which, as well as providing power to a drive motor and to at least one motor which drives the pump or pumps for the working and steering hydraulics, acts as a counter-weight for the load being lifted or moved on the forks.

Access is required to the battery in order to provide for charging, topping up and specific gravity checks, as well as general inspection and equalizing charges. All of these maintenance requirements are well-known in the art and will not be described in detail in this specification. In certain applications for forklift trucks, it is normal to replace the battery up to three times per day in order to allow continuous service of the truck. Therefore, the ease of access for removing and replacing the battery will considerably enhance the operating efficiency of the truck. Since the cost of a battery represents between 10 and 15% of the cost of the truck, battery maintenance cannot be neglected.

An electric reach truck has to be of compact design, yet provide the driver with good visibility so that he can at all times see as far as possible the location of the forks. The battery compartment must be located as low as possible in the vehicle in order to keep a low center of gravity for stability. For a reach truck, a number of operating controls are necessary in order to control the lift, reach, tilt and side shift of the forks. An auxiliary horn and emergency stop control as well as other indicators to show, for example, working time or the state of the battery charge are also typically required in a control panel.

In existing electric reach trucks, two systems have been provided for battery access. In one arrangement, as employed in many electric reach trucks manufactured by, for example, Boss (WR series), Linde Lansing, Still and Saxby (464 range), the battery unit is mechanically latched to the reach carriage so that the complete assembly may be reached towards the mast using the battery's own power under the control of the hydraulic system. This configuration requires that the battery be located between the operator and mast, requiring the operator to look sideways over the battery and control panel to see the forks. The control panel is typically located in a fixed housing that overlies the battery. The linkages needed to latch the battery to the reach carriage are also complex, expensive and prone to failure. A further disadvantage of this system is that battery access is extremely difficult in the event of battery failure.

An alternative arrangement is to mount the battery on rollers and to provide a separate frame which can be located adjacent to the battery to enable an operator to roll the battery out of the truck manually. This is usually the less favored option though manufacturers are prepared to offer it at an extra cost. Servicing of the battery without removing the battery is generally not possible. In either case, when the battery has to be removed it is necessary to either use a crane (once the battery has been reached out from beneath the control panel housing) or transfer the battery from its carriage sideways using rollers.

In another design of electric forklift truck, known generally as a counterbalance truck, the battery is located to the rear of the vehicle instead of beneath the control panel housing. This configuration is adopted in the Still R50 range, and although providing for good driver visibility in allowing the controls to be mounted at a lower level, this arrangement is at the expense of overall compactness of design.

Another technical problem associated with the design of electric forklift trucks is separating the hydraulic systems and the electrical systems, in order to minimize the risk of contamination of the electrical components by hydraulic fluid.

In most existing forklift trucks, the operator controls for the working hydraulics are themselves hydraulically operated levers. This gives rise to problems of shock loading. Because the movement of the levers directly governs the movement of a valve spool, sudden and vigorous movement of the levers will result in hydraulic shock which can effect the whole hydraulic system. Abuse of this nature can result in early fatigue failure problems with the mechanical components because they are continually subjected to such shocks. In existing truck designs, attempts have been made to solve this technical problem by inserting accumulators to minimize the shock. However, this requires an extra component in the hydraulic circuit and results in increased expense and further maintenance and reliability problems. However, Mitsubishi in their diesel powered forklift truck have utilized miniature joysticks which provide an electrical position output in order to control the working hydraulics.

Accordingly, there is a need for a forklift truck which provides easy access to the battery and solves the problem of hydraulic shock by pre-processing the electrical signals generated by control elements such as joystick controls before they are used to control movement of the hydraulic valves.

SUMMARY OF THE INVENTION

In order to solve, at the same time, the technical problems of providing a compact design, efficient access to the battery, avoiding contamination of electrical components with hydraulic fluid and ensuring good visibility for the operator of the truck, the present invention provides a layout for an electric forklift truck in which a battery compartment is located adjacent to an operator's compartment, and an operator's console housing non-hydraulic controls for the working hydraulics of the truck is mounted above the battery compartment such that it is movable between a closed position overlying the battery and an open position in which access for removal or servicing of the battery is possible.

With this type of layout, it is possible to position the mast either to the front of the operator's compartment, as in the configuration of a counterbalance truck, to the battery side of the operator's compartment, as in the conventional reach truck, or to the other side. With any of these configurations, access to the battery is preferably by the simple expedient of pivoting the operator's console away from the top of the battery compartment in order to allow access to the battery for maintenance or for removal either by crane lifting gear or rolling the battery out manually.

Other objects and advantages of the invention will be apparent from the following description, the accompanying drawings and the appended claims.

DETAILED DESCRIPTION

Figure 1:
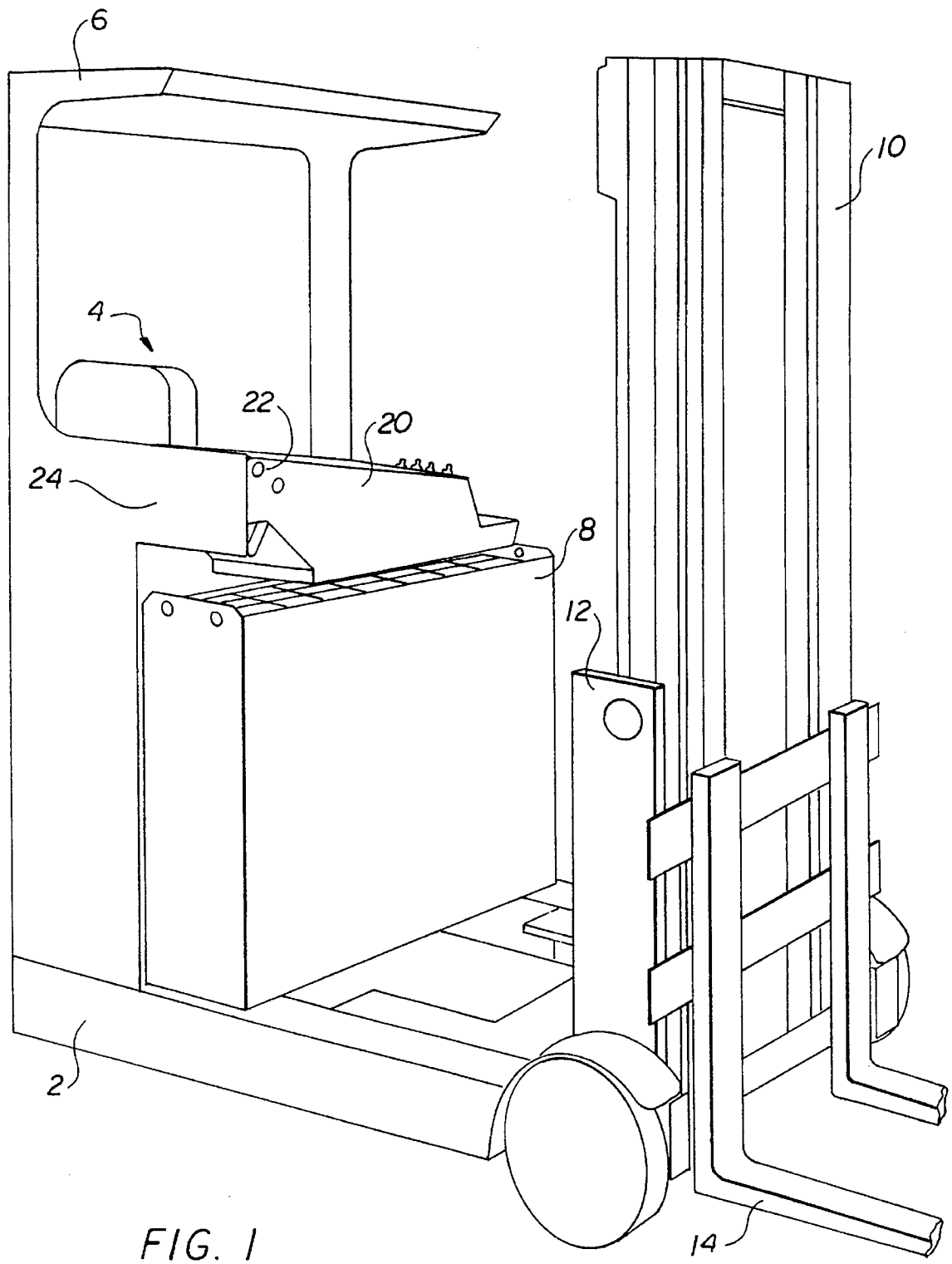
FIG. 1 is a perspective view of a forklift truck in accordance with the invention.

As shown in FIG. 1, a forklift truck 2 has an operator's compartment 4 and overhead guard 6. A battery compartment 8 is located to one side of the operator's compartment 4. A mast 10 is located at the rear of the truck such that the operator sits to the front of the vehicle with his back to the left side and facing the right side.

The mast 10 is mounted on a reach carriage 12 and carries the load-bearing forks 14 mounted on a tilting carriage. The mast 10 includes working hydraulics for controlling the movement of the forks 14. It will be appreciated that this part of the truck may be of any conventional design, and therefore, is not described here in any further detail. In the embodiment shown in FIG. 1, the mast 10 and reach carriage 12 are conveniently positioned to the rear of the truck (to the side of the driver's compartment), but it should be noted that these parts may with appropriate engineering changes be located to the front, opposite the battery compartment, for increased operator visibility without departing from the scope of the invention. Locating the mast and reach carriage at the front of the truck increases visibility since the operator is not required to look over the battery at the forks.

Figure 2:
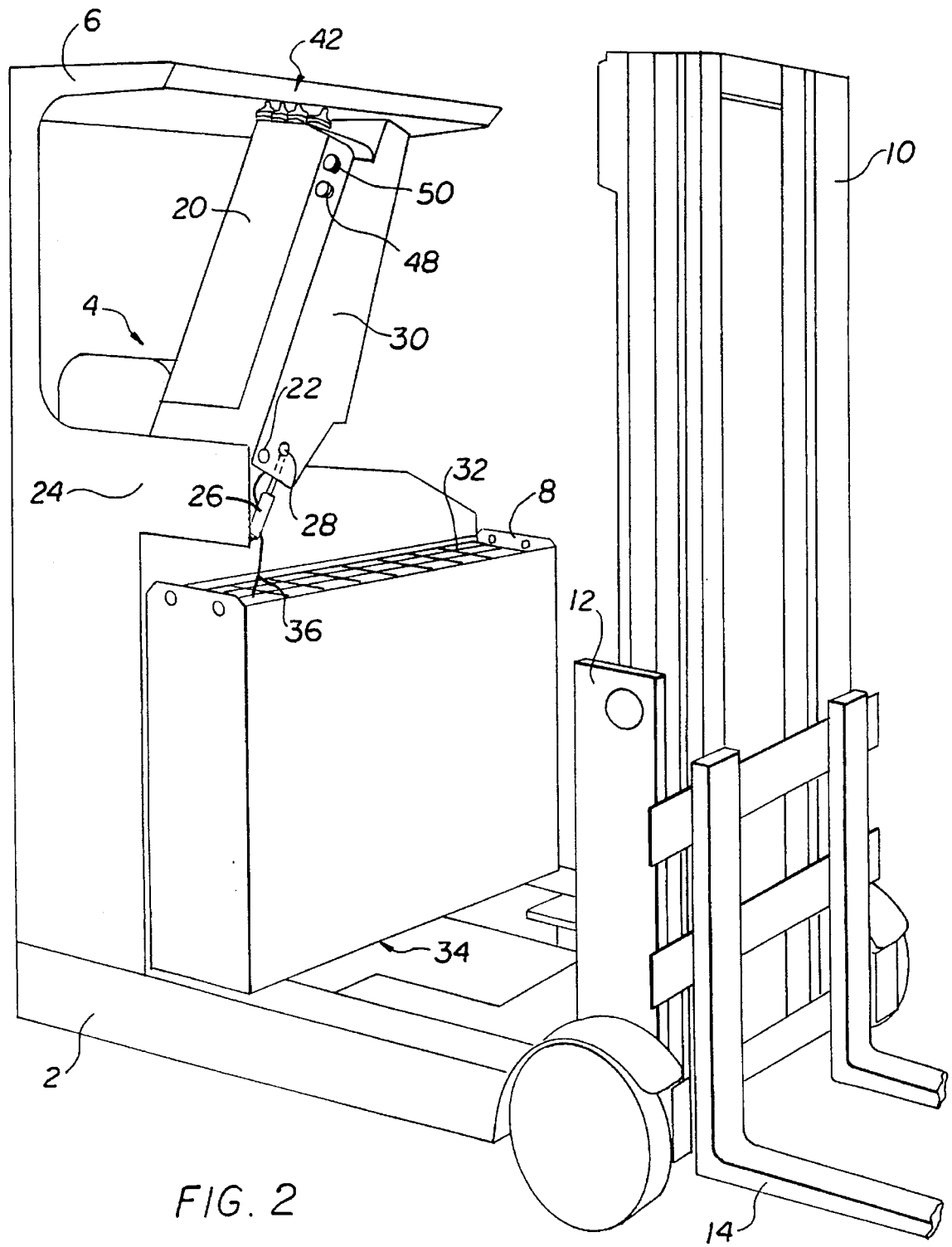
FIG. 2 shows the same truck as in FIG. 1 with the operator's console pivoted up in order to allow battery access.

An operator's console 20 is positioned above the battery compartment 8. The console 20 also serves as an arm rest for the operator. The console 20 is hinged by means of a bolt 22 to a back wall 24 of the truck. As shown in FIG. 2, a gas strut 26 is connected between a mounting on the back wall 24 and a fixing point 28 on a housing 30 of the operator's console 20 in order to allow the operator's console to be pivoted upwardly from the position shown in FIG. 1 to the position shown in FIG. 2. The strut 26 allows the console 20 to be held in the raised position in order to allow access to a removable battery 32 located on rollers 34 in the battery compartment 8.

Figure 3:
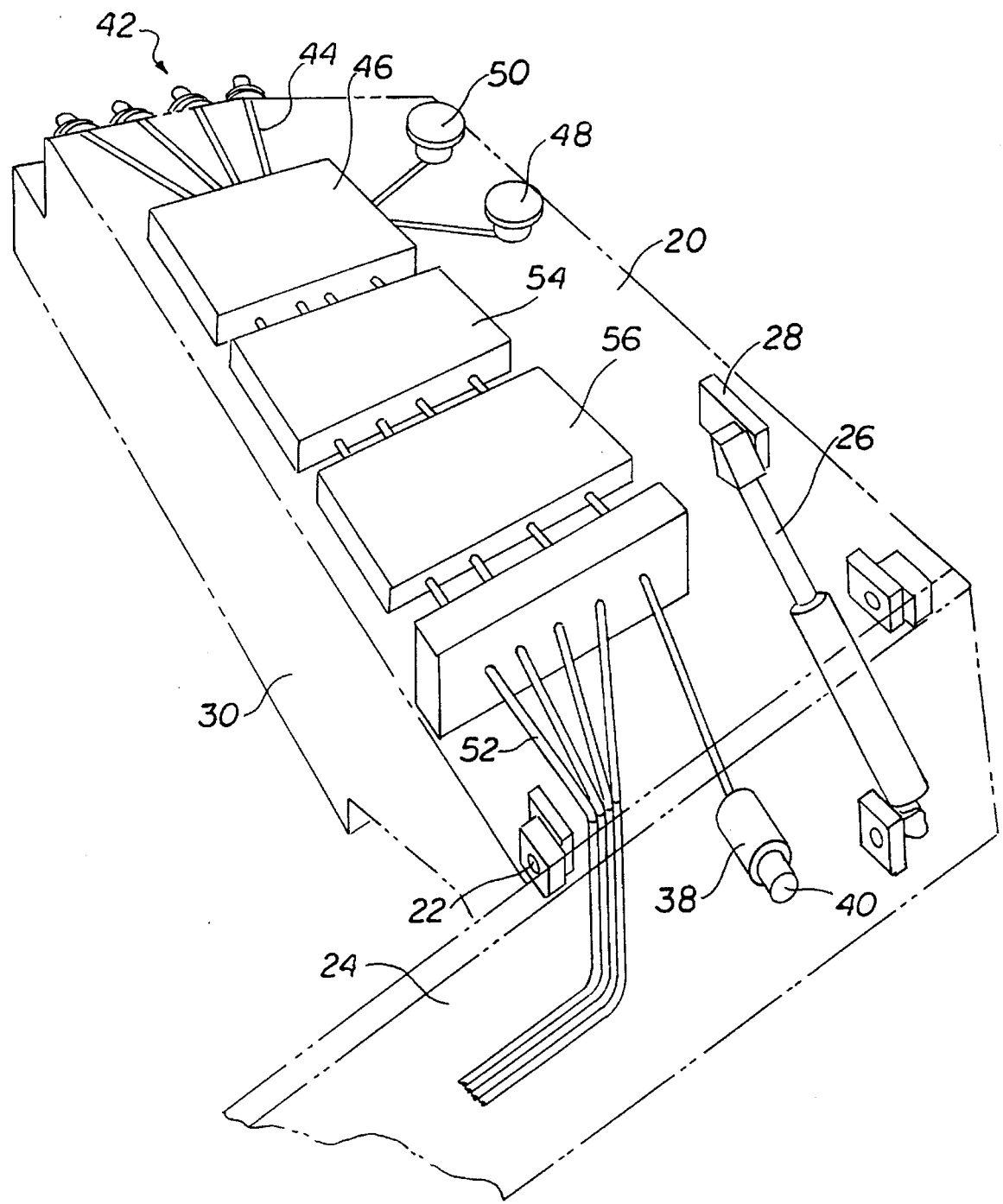
FIG. 3 is a diagrammatic plan view of the operator console in the raised position with its cover removed and the side and rear walls treated as transparent.

A flexible cable 36 provides power from the battery 32 to electrical circuits in the operator's console 20. As shown in FIG. 3, cut out switch 38 is provided between the cable 36 and electrical components in the console 20 and has an actuating member 40 which allows the switch to be closed when the console is in the closed position shown in FIG. 1, but which disconnects the power supply to the electrical circuits in the operator's console when the console is lifted into the open position shown in FIG. 2. The actuating member or plunger 40 may operate the switch by contact with the rear wall 24 of the battery compartment in the closed position to allow current to flow. When the console is pivoted up as shown in FIGS. 2 and 3, the plunger 40 will move out to the position shown in FIG. 3 to disconnect the battery.

Although the operator's console has been described as pivoting about a horizontal axis, it would also be possible to pivot the console about a vertical axis, or indeed any appropriate intermediate axis, if desired, without departing from the scope of the invention.

The electrical components in the operator's console 20 include an array of four miniature fingertip actuated joysticks 42 which each provide an independent electrical position signal on output lines 44. Although joysticks are illustrated, any type of control element that can produce an electrical position signal could be utilized. These position signals are used, via an interface unit 46, to control a respective one of the lift, reach, tilt and side shift functions of the forks 14 by means of the working hydraulics fitted to the truck. The interface unit 46 includes circuits which process the signals generated by movement of the joysticks 42. These circuits ensure that the signals provided to the hydraulics are ramped up and ramped down over appropriate delay periods in order to prevent hydraulic shock and consequent damage to the mechanical parts of the vehicle. The delays are selected so that the operator retains effective control. Too long of a delay could result in overshoot. The delay is dependent on the different function being controlled and the various delays are not necessarily the same and are chosen to balance the risk of mechanical damage due to shock movements and the requirements of controllability. This effectively solves the problems of hydraulic shock associated with the use of hydraulic control levers and ensures a longer working life for the mechanical parts. The number of joysticks required is obviously dependent on the facilities incorporated into the working hydraulics and is usually between three and five, though more may be provided if necessary. The use of miniature joysticks requires less operator effort than conventional hydraulic levers and facilitates longer working periods involving complex maneuvers without unduly tiring the operator.

The operator's console 20 also includes an emergency stop press button 48 and a horn control 50. The output from the joysticks 42, the emergency stop and horn switches are fed via the interface unit 46, which is provided with its power supply from the battery 8 via flexible cables. The control signals output from the interface unit 46 are fed via further circuit boards through a further flexible cable 52 which passes over the hinge mounting of the console 20 to a proportional valve located under the seat in the driver's compartment. These electrical signals control the settings of the proportional valve which in turn controls the hydraulic supply to the various working hydraulics in order to perform the functions required.

Other electrical components required for the operation of the truck can also conveniently be mounted on circuit boards within the operator's console housing 30, thereby isolating them from the hydraulic components of the truck, in order to reduce the risk of contamination by hydraulic fluid. These electrical components include a pulse control unit 54 for the traction motor, a pulse control unit 56 for a pump motor, as well as contactors, fuses and a cooling fan (not shown) and the necessary wiring loom.

The precise requirements for electrical components are dictated by the design and functions of the mast and working hydraulics as well as the design of the traction system and the instrumentation required and it will be appreciated that various configurations are possible within the operator's console housing 30. Moreover, although it is preferred to bring as much electrical control circuitry as possible within this housing 30 so that it can be manufactured as a complete sub-assembly, this is not essential for the purposes of the invention. Even using the console housing 30 to accommodate the electrical components it can still be kept to a low profile which does not impede visibility.

It will also be appreciated that by eliminating all hydraulic hoses from the operator's console and using electric controls for the working hydraulics, not only is the risk of contamination from hydraulic fluid avoided, but also there is no need for any hydraulic hoses to pass across the hinged joint between the pivotal operator's console and the wall of the truck. Since the hydraulic components are now separated from the controls, the length of the necessary hydraulic hose runs is reduced increasing hydraulic efficiency.

With the operator's console in the raised position as shown in FIG. 2, there is clear access to the battery 8 which can be attached to a battery lifting jib in order to remove or change the battery by lifting it upwards and outwards away from the console. Alternatively, rollers may be fitted underneath the battery and a roll out frame located adjacent to the battery to allow the battery to be manually rolled out and a fully charged battery rolled back in.

While the apparatus herein described constitutes a preferred embodiment of the invention, it is to be understood that the invention is not limited to this precise form and that changes may be made therein without departing from the scope of the invention.

What is claimed is:

1. An electric forklift truck comprising:

an operator compartment;

a battery compartment adjacent to said operator compartment;

an operator console, said console housing non-hydraulic, electrical controls for producing an electrical position signal and for actuating hydraulics of said truck, said console being pivotally mounted above said battery compartment and moveable between a closed position overlying said battery compartment and an open position in which access for removal or servicing of said battery is possible; and a switch for automatically disconnecting battery power to the electrical controls in the console in response to said console being moved to said open position.

2. The truck of claim 1 wherein said console is mounted on a wall of said truck.

3. The truck of claim 1 wherein said battery is connected to said console by a cable, and said disconnecting means is a switch located between said console and said cable.

4. The truck of claim 2 wherein said battery is connected to said console by a cable.

5. The truck of claim 4 wherein said switch is located between said cable and said electrical components in said console.

6. The truck of claim 5 wherein said switch includes an actuating member for operating said switch.

7. An electric forklift truck comprising:

an operator compartment;

a battery compartment adjacent to said operator compartment;

an operator console, housing electrical components for actuating hydraulics of said truck, said console being pivotally mounted above said battery compartment and moveable between a closed position overlying said battery compartment and an open position in which access for removal or servicing of said battery is possible; said battery being connected to said console by a cable; and a switch operated by an actuating member and being located between said cable and said electrical component in said console for automatically disconnecting battery power in response to said console being moved to said open position;

wherein said actuating member is positioned to contact a rear wall of said battery compartment when said console is in said closed position to allow current to flow from said battery to said console.

8. The truck of claim 7 wherein said electrical components include means for producing electrical position signals to control the working hydraulics of the truck.

9. The truck of claim 8 wherein said console includes means for processing said position signals before applying said signals to said working hydraulics in order to reduce shock.

10. The truck of claim 9 wherein said producing means is at least one joystick located on said console for operating said working hydraulics.

11. The truck of claim 10 wherein said signals are output from said console through a cable which passes over said console mounting and to a proportional valve located under a seat in said operator compartment to control said working hydraulics such that hydraulic fluid from said working hydraulics is separated from said electrical components.

12. An electric forklift truck comprising:

an operator compartment;

a battery compartment adjacent to said operator compartment, said compartment including a battery; and a console housing electrical components for actuating working hydraulics on said truck, said console being pivotally mounted to a wall of said truck above said battery compartment and moveable between a closed position overlying said battery compartment and an open position in which access for removal or servicing of said battery is possible, said console including a plurality of joysticks for producing electrical signals for operating said working hydraulics, a cable for connecting said battery to said components, and a switch for disconnecting power from said battery to said console, said switch including an actuating member which contacts a rear wall of said battery compartment when said console is moved to said closed position to allow current to flow from said battery to said console.

\* \* \* \* \*